Dec. 8, 1959 F. R. WERNER ET AL 2,915,969
SLIP CONTROL MECHANISM FOR CASH REGISTERS
AND ACCOUNTING MACHINES
Original Filed July 1, 1955 5 Sheets-Sheet 1

INVENTORS
FRANK R. WERNER
HAROLD O. RANDALL &
KENNTH C. FLINT

BY

THEIR ATTORNEYS

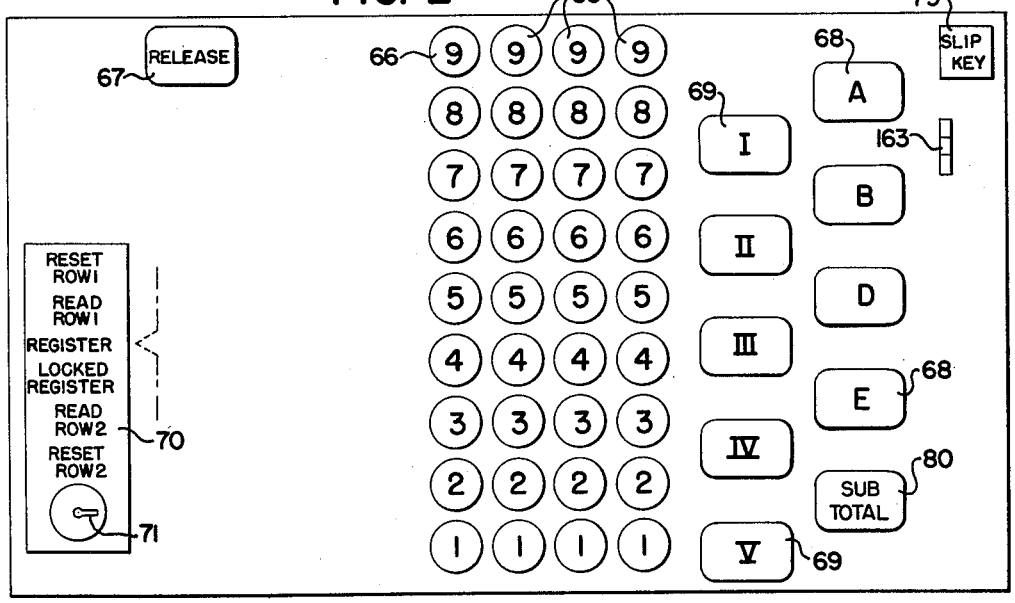

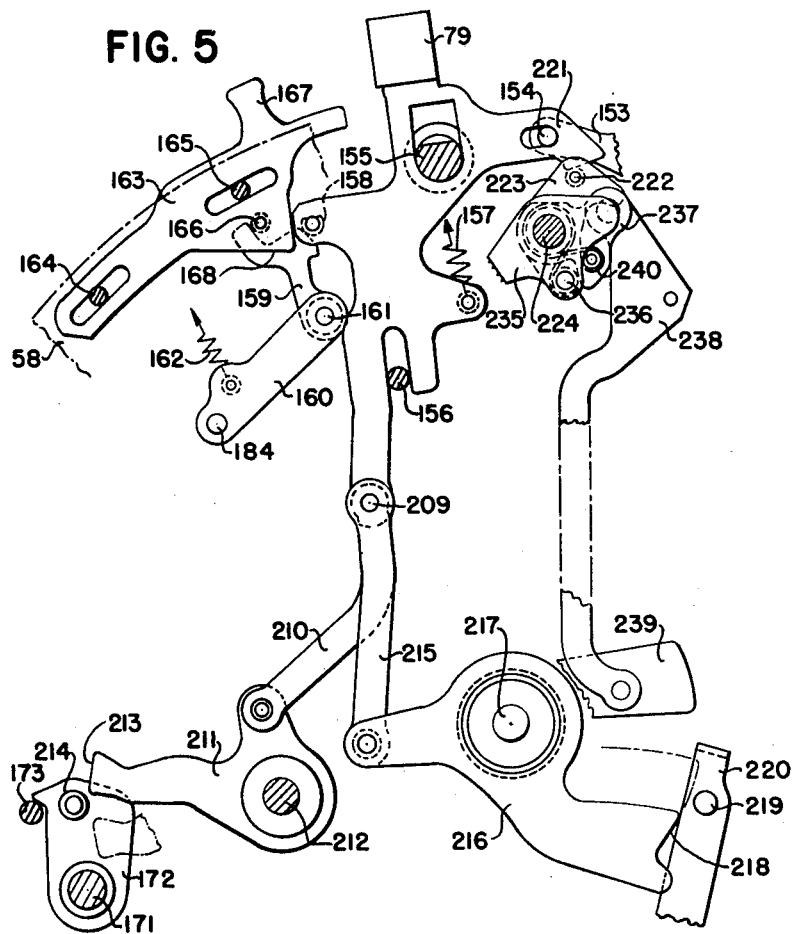

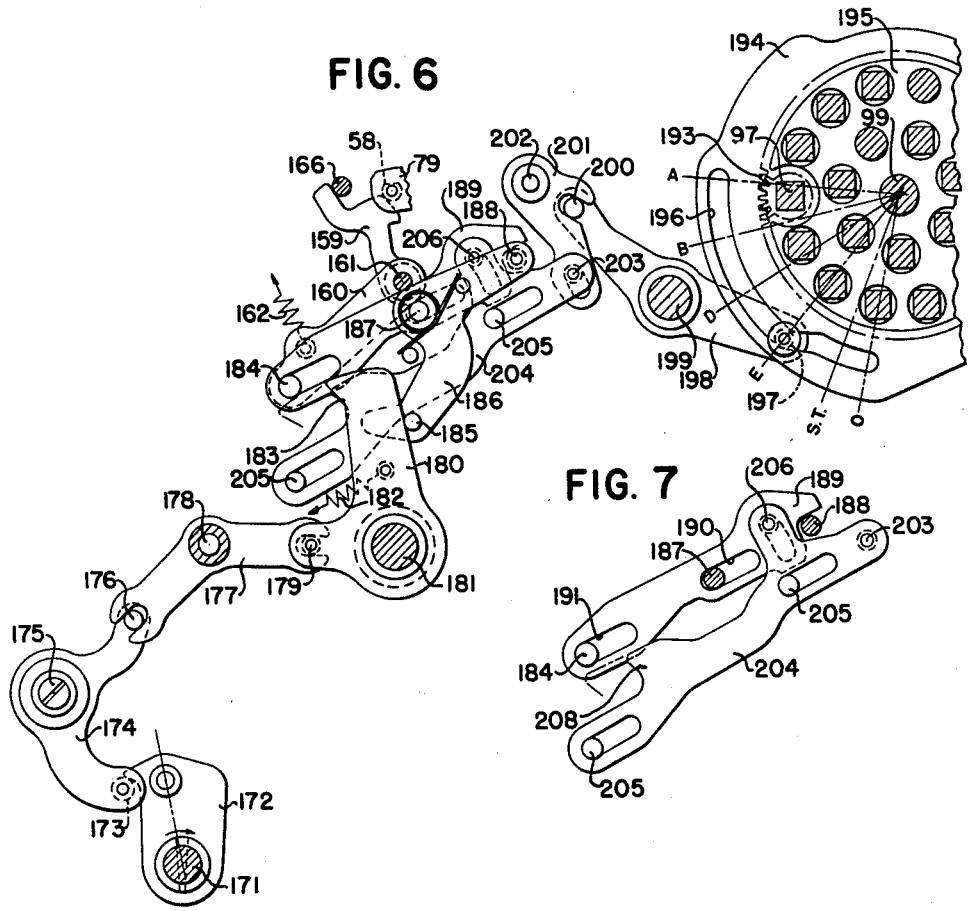

Dec. 8, 1959  F. R. WERNER ET AL  2,915,969
SLIP CONTROL MECHANISM FOR CASH REGISTERS
AND ACCOUNTING MACHINES
Original Filed July 1, 1955  5 Sheets-Sheet 5

INVENTORS
FRANK R. WERNER
HAROLD O. RANDALL &
KENNETH C. FLINT

BY *Louis A. Kline*

*Richard Van Buren*

THEIR ATTORNEYS

United States Patent Office 2,915,969
Patented Dec. 8, 1959

---

2,915,969

SLIP CONTROL MECHANISM FOR CASH REGISTERS AND ACCOUNTING MACHINES

Frank R. Werner and Harold O. Randall, Dayton, and Kenneth C. Flint, West Carrollton, Ohio, assignors to The National Cash Register Company, Dayton, Ohio, a corporation of Maryland Original application July 1, 1955, Serial No. 519,426, now Patent No. 2,884,851, dated May 5, 1959. Divided and this application December 19, 1958, Serial No. 781,638

7 Claims. (Cl. 101—93)

This invention relates to cash registers and accounting machines and is particularly directed to the insertable or slip record material mechanism of such machines and to the mechanism for controlling the operation of said record material mechanism.

This application is a division of the co-pending application for United States Letters Patent filed July 1, 1955, by Frank R. Werner, Harold O. Randall, and Kenneth C. Flint, Serial No. 519,426, which issued into United States Patent No. 2,884,851 on May 5, 1959.

The general object of this invention is the provision of a machine of the general type referred to above, of compact dimensions and economical construction, having many of the features and appointments usually found only in larger and more expensive machines.

Another object is to provide a machine, of the character referred to above, with the necessary equipment for recording data relating to various transactions upon a detail strip, an issuing receipt, and an insertable slip or other insertable record material.

Another object is to provide an efficient and economically-constructed machine for recording rata relating to various transactions on insertable record material.

Still another object is the provision of an operable member for rendering the slip-printing mechanism operable or inoperable at the option of the operator.

Another object is the provision of means including a manually-operable member and mechanism operated thereby to control the functioning of the insertable record material mechanism.

With these and incidental objects in view, the invention includes certain novel features of construction and combinations of parts, a preferred form or embodiment of which is hereinafter described with reference to the drawings which accompany and form a part of this specification.

Of the drawings:

Fig. 2 is a diagrammatic plan view of the keyboard of the machine embodying this invention.

Fig. 3 is a facsimile of a duplicate sales slip having identical data recorded on the upper ends of the two portions by the improved mechanism disclosed herein.

Fig. 4 is a facsimile of a fragmentary portion of the detail strip prepared on the present machine in the same transaction in which the recordings were made on the duplicate sales slip of Fig. 3.

Fig. 5 is a right side elevation of the slip key and the mechanism associated therewith for controlling the functioning of the machine in slip-printing operations.

Fig. 6 is a right side elevation of the mechanism for controlling the depression and release of the slip key, depending upon the type of machine operation being performed.

Fig. 7 is a detail view of a portion of the controlling mechanism shown in Fig. 6.

Figure 1:
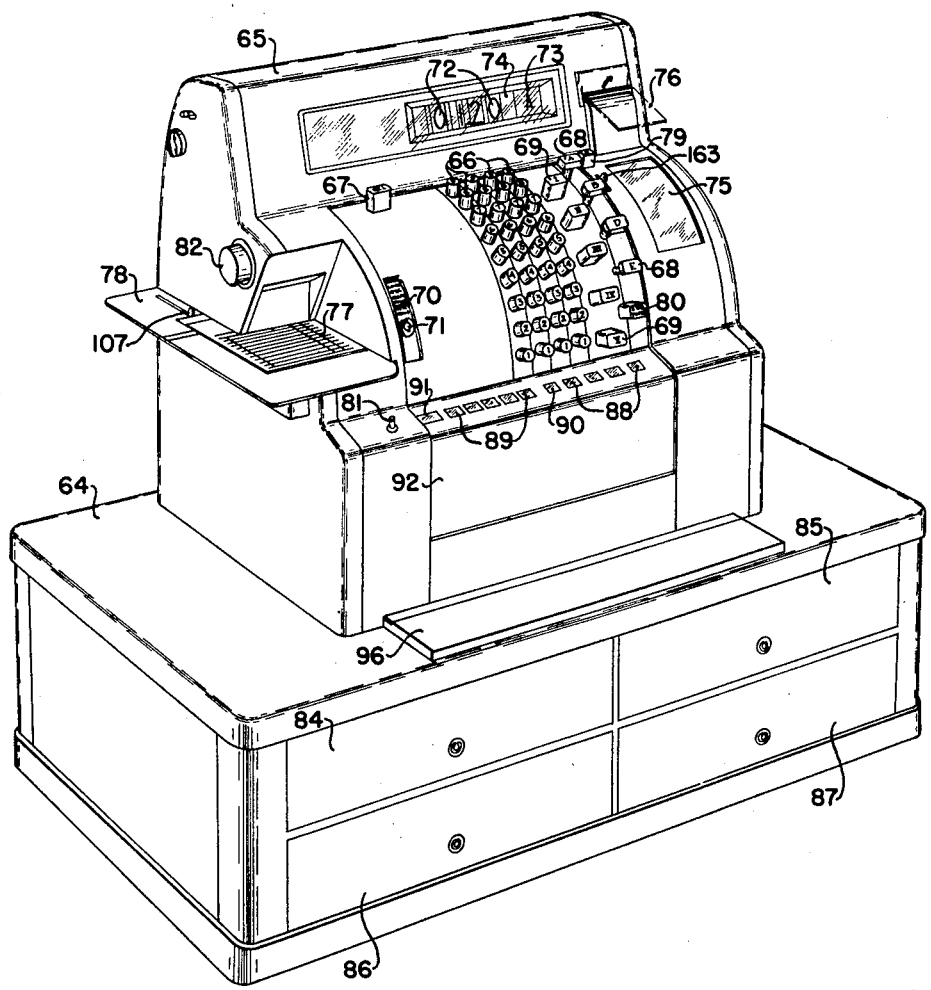
Fig. 1 is a perspective view of the complete machine embodying the present invention.

The machine chosen to illustrate the present invention is identical in appearance and in many of its structural details to the machine disclosed in co-pending application for Letters Patent of the United States Serial No. 412,464, filed February 25, 1954, by Frank R. Werner and Kenneth C. Flint, inventors, to which reference may be had for a full disclosure of similar mechanism illustrated in the present application which is not pertinent to the present invention and which for that reason will be described only in a general way herein.

Mechanism pertinent to an understanding of the present invention will be described in detail in the ensuing pages.

*Machine in general and its supporting framework*

The framework of the machine comprises main right and left frames 50 and 51 (Fig. 8) and their corresponding auxiliary frames 52 and 53, which are secured, respectively, to the upper ends of their corresponding main frames, said main frames being secured in proper spaced relationship to each other by a machine base 54, to which they are secured, by a back plate 48, secured between said main frames, and by various cross frames, rods, and shafts. The framework also includes right and left totalizer frames 55 and 56 (Fig. 8), secured, respectively, to their corresponding main frames 50 and 51 by various screw studs, rods, and shafts. The framework also includes a receipt roll support plate 57, a detail support plate 58, and a right printer plate 59, all of said plates being connected to the main frame 50 by means of various screw studs, rods, and shafts in the usual manner. Likewise, a receipt hammer support plate 60 is connected in proper spaced relationship to the right auxiliary frame 52 by various screw studs, rods, and shafts. Also, the framework of the machine comprises a left printer plate 61 (Fig. 8) for the slip-printing mechanism, and a left type wheel support plate 62 for the slip-printing mechanism, said plates being secured in proper spaced relationship, respectively, to the main left frame 51 and to the left auxiliary frame 53.

The base 54 is secured inside a shallow oil-drip pan 63, in turn secured to the top surface of a drawer cabinet 64 (Figs. 1 and 8), and the mechanism of the machine is enclosed in a suitable case or cabinet 65, secured to the pan 63.

The keyboard of the machine comprises, in the present instance, four denominational rows of amount keys 66 (Figs. 1 and 2) and a release key 67 for releasing any depressed amount keys, said amount keys being of flexible construction, wherein the depression of a key in a particular denomination, after a key has already been depressed in said denomination, releases the previously-depressed key, and so on. The keyboard likewise includes four Clerks' transaction or control keys 68 for selecting clerks' totalizers corresponding to said keys, and for simultaneously initiating machine operation, and includes five Department or Item control keys 69, which control the selection of corresponding totalizers to receive amounts set up on the amount keys 66, said control keys 69 also arranged to initiate machine operation on being depressed, the same as the clerks' keys 68. The keyboard also includes a unit lock lever 70, often referred to as a total control lever, which is movable to various positions to control the functions being performed in the totalizers. The total control lever 70 (Figs. 1 and 2) is provided with a lock 71, the keys of which are generally retained by some person in authority, for locking said total control lever in certain positions and for locking it against movement into certain other positions. The various positions of the total control lever 70 are engraved upon its face, and, when brought into register with an arrow formed in an opening in the keyboard, through which the face of said total control lever is visible, the lever conditions the machine for the type of operation indicated by the engraving.

Reading from top to bottom (Figs. 1 and 2), the engraved positions on the total control lever 70 are as follows: "Reset Row 1," in which the totalizers corresponding to the Clerks' keys 68 are reset, or zeroized; "Read Row 1," in which the wheels of said clerks' totalizers are sub-totalized, or read; "Register," in which the totalizers corresponding both to the Clerks' keys 68 and to the Department keys 69 are conditioned for addition; and "Locked Register," in which the machine is locked against operation by all keys being locked against depression. Continuing the engraved positions of the total control lever 70, the next positions are "Read Row 2," in which the totalizers corresponding to the Department or Item keys 69 are conditioned for a reading, or sub-totaling, operation, and "Reset Row 2," in which the totalizers corresponding to the keys 69 are conditioned for resetting, or totalizing, operations. The lock 71 for the total control lever 70 (Fig. 2) is usually provided with two keys, one of which permits the total control lever to be moved to all positions with the exception of "Reset Row 1" and "Reset Row 2" positions, and the other key, often referred to as a "Reset key," permits the total control lever 70 to be moved to all positions including "Reset Row 1" and "Reset Row 2." With either of the keys mentioned above, the total control lever 70 may be locked in "Locked Register" position to prevent operation of the machine.

The amount keys 66 (Figs. 1 and 2) and the control keys 68 and 69 are provided with front and back indicators 72, 73, and 74 (only the front indicators being shown here), which are visible through corresponding openings in the cabinet or case 65, said indicators being positionable under the control of the corresponding keys to visibly indicate the amount and the type of machine operation being performed. In read and resetting operations, often referred to as sub-total and total operations, the amount indicators 72 are positioned under control of the wheels of the selected totalizer corresponding to the control keys 68 and 69, in the usual manner.

The amount keys 66 and the control keys 68 and 69 likewise control corresponding type wheels for printing related data upon a detail strip 75 (Fig. 3), upon an issuing receipt 76 (Fig. 1), and upon an insertable duplicate slip 77 (Fig. 4). A portion of the detail strip, containing the latest entries, is visible through a corresponding opening in the cabinet 65, and the receipt 76 is issued through a slot in said cabinet past a tearing blade, which may be used for separating the finished receipt from the web thereof. A table 78 is provided for presenting the insertable slip 77 to the printing mechanism, and said table is provided with an adjustable stop for determining the positioning of the printing on said insertable slip. A small electric light (not shown) is provided for illuminating the slip table and the slip when necessary, and said light is controlled by a switch 81, conveniently located on the front portion of the cabinet 65. A removable cap 82 provides access to the light, when necessary, for the purpose of replacing the bulb.

In the present arrangement of the machine of this invention, all entries are made upon the detail slip 75. However, it is not possible to issue a receipt and print upon an insertable slip during the same machine operation, and, to properly condition the machine for a slip-printing operation, a slip key 79, located immediately to the right of the Clerks' keys 68, is provided and, upon being depressed, renders the receipt issuing and printing mechanism inoperative and simultaneously activates the slip-printing mechanism. A shiftable slide 163 (Figs. 1 and 2), located immediately below the slip key 79, is provided for manually releasing said key or for manually locking said key in depressed position against automatic release at the end of machine operation, whenever necessary or desirable.

By referring to Fig. 1, it will be seen that the drawer cabinet 64 contains four drawers, 84 to 87 inclusive, corresponding to the four Clerks' keys 68, the opening of which drawers near the end of operation is effected by the depression of said corresponding Clerk's key 68.

The machine is likewise provided with four special counters 88 (Fig. 1), corresponding to the Clerks' keys 68, which count "1" each time a corresponding key is used to initiate a machine operation; five special counters 89, corresponding to the Department keys 69, which likewise count "1" each time the corresponding ones of said keys are used to intiate machine operation; a reset counter 91, which counts "1" each time the total control lever 70 is moved to "Reset 1" or "Reset 2" position; and an item counter 90, which in multiple-item transactions counts "1" for each item entered in the item totalizer. The item counter is automatically cleared of the items counted in the previous transaction at the beginning of a succeeding machine operation. The special counters 88, 89, 90, and 91 (Fig. 1) are visible through corresponding apertures in an offset angular portion of a cabinet front plate 92, secured to the machine framework.

In addition to the nine totalizers corresponding to the control keys 68 and 69, the present machine is provided with an item totalizer for accumulating the amounts of the items as they are listed in the item-entering operations of a multiple-item transaction and for transferring the total amount of said items into the clerk's totalizer corresponding to the depressed Clerk's key 68 in a final item total operation. An Item Sub-Total key 80, located immediately below the Clerks' control keys 68, is provided for reading the amount in the item totalizer any time during a multiple-item transaction.

Each Clerk's key 68 (Fig. 1) is provided with a pin-type cylinder lock (not shown) controlled by a key formed by a shank portion (not shown) integral with the tip or finger portion of the corresponding Clerk's key. When the key is inserted in the lock, the corresponding Clerk's key 68 may be depressed, and, when the key is removed from said lock, the Clerk's key is locked against depression. This provides a safety feature which prevents the intentional or otherwise entering of amounts into the wrong clerk's totalizer and further provides means whereby a clerk may lock his key 68 against depression by unauthorized persons if for any reason it is necessary for him to leave his post of duty.

Secured to the top surface of the cabinet 64 (Fig. 1), directly above the clerks' drawers 84 to 87 inclusive, is a coin slab 96, for use in making change.

The present application is directed particularly to the slip key and the mechanism controlled thereby for cash registers and accounting machines, and said mechanisms will be described in detail in the ensuing pages. Other mechanism illustrated herein, and not pertinent to the slip printing and feeding mechanisms, will be described only in a general way, and, if a more complete description of said mechanisms is desired, reference may be had to the co-pending United States patent application Serial No. 412,464, referred to before, and to the co-pending United States application Serial No. 341,633, filed March 11, 1953, by Frank R. Werner, Kenneth C. Flint, and Walter G. Sterzer, inventors, which applications provide a complete disclosure of the mechanisms embodied in machines of this type.

*Slip key mechanism*

The slip key 79 (Figs. 1, 2, and 5) is depressibly mounted by means of parallel slots therein in cooperation with a shaft 155, supported by the frames 50 and 51 (Fig. 8), and a stud 156, secured in the plate 58. A spring 157 is tensioned to urge the slip key 79 upwardly to undepressed position. Depression of the slip key 79 (Fig. 5), against the action of the spring 157, causes a flat upper surface on a stud 158, carried by said key, to by-pass a latching shoulder on a latch 159 integral with an arm 160 free on a stud 161 secured in the plate 58. As the stud 158 by-passes the shoulder on the latch 159, a spring 162 urges the arm 160 and said latch clockwise, to move said shoulder into the path of said stud to retain the slip key in depressed position.

Figure 8:
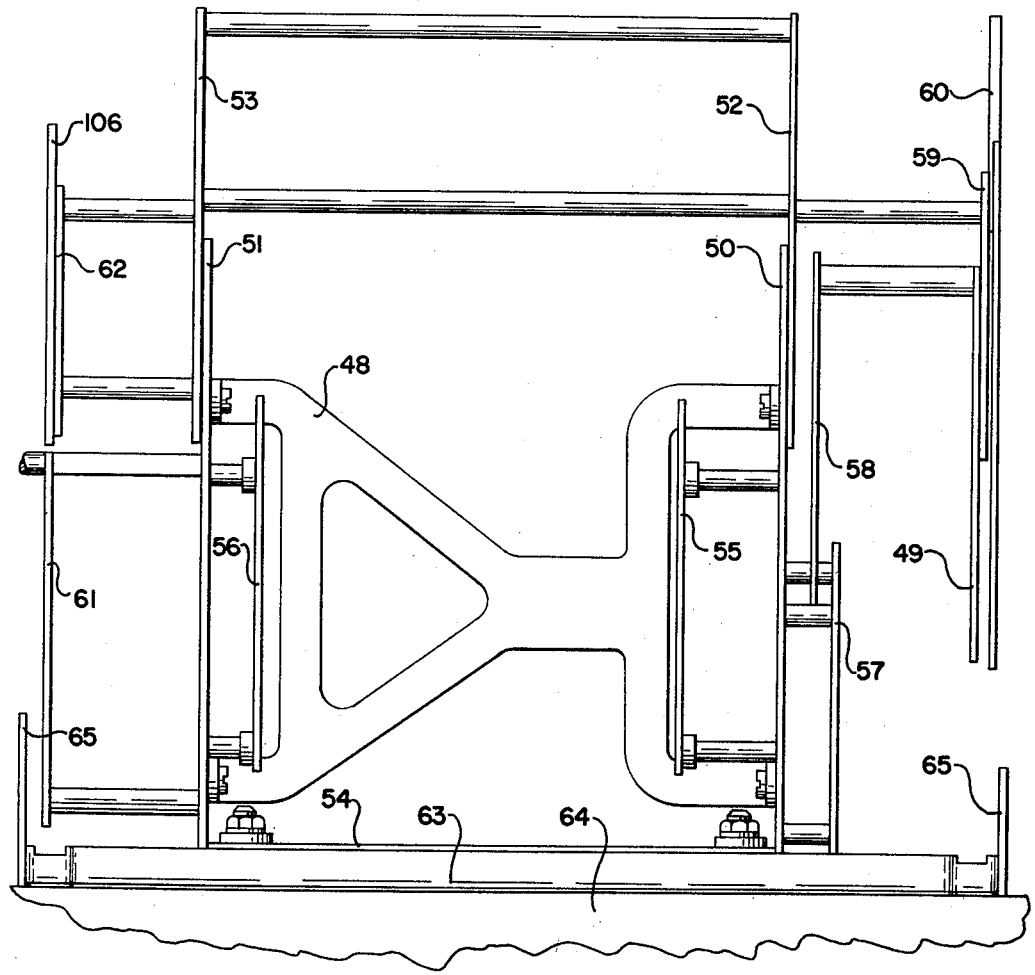
Fig. 8 is a front elevation showing in diagrammatic form the side-spacing of the framework of the machine.

A manually-operable slide 163 (Figs. 1 and 5) is provided either for releasing the slip key 79 when depressed, or for securing said key in depressed position against automatic release. The slide 163 is shiftably mounted by means of slots therein, in cooperation with studs 164 and 165 secured in the plate 58 (Fig. 8). Shifting the slide 163 forwardly, or toward the left (Fig. 5), by means of an upwardly-extending finger piece 167, causes a stud 166, carried thereby, in cooperation with an upward extension of the latch 159, to rock said latch and the arm 160 counter-clockwise against the action of the spring 162, to move the latching shoulder on said latch out of the path of the stud 158, to free the slip key 79 for upward movement to undepressed position, under influence of the spring 157. Shifting the slide 163 rearwardly, or toward the right, when the slip key 79 is in depressed position, moves a latching shoulder 168 on said slide above the flat upper surface of the stud 158 to secure the slip key 79 in depressed position against release by the automatic releasing mechanism, which, through the arm 160, operates the latch 159 in a manner to be explained later.

*Interlock between machine-releasing mechanism and slip key*

Mechanism operated by the key lock line or shaft, when the machine is released for operation, locks the slip key against depression when it is in undepressed position, and locks said key against release when it is depressed, until near the end of machine operation.

Depression of one of the control keys 68 or 69 (Figs. 1 and 2) frees a key lock shaft 171 (Figs. 5 and 6), journaled in the machine framework, for initial movement clockwise, which movement operates mechanism which closes the switch to the operating motor and simultaneously operates the clutch mechanism which connects said operating motor to the main machine-operating shaft (not shown) for operation thereby. Fast on the key lock shaft 171 is an arm 172 having a forward extension, which coacts with a stud 173 in the downward arm of a bell crank 174 (Fig. 6) free on a stud 175 secured in the right frame 50. An upward arm of the bell crank 174 carries a stud 176, which engages the bifurcated lower end of a lever 177, carrying a stud 178, which journals in a bushing secured in the detail support plate 58. The rearward arm of the lever 177 is bifurcated to embrace a stud 179 in a forward extension of an arm 180 free on a stud 181 extending between the frame 50 and the plate 58, said stud arranged to support the supply roll for the detail strip. A spring 182 urges the arm 180 and the bell crank 174 counter-clockwise to normally maintain the stud 173 in yielding engagement with the forward extension of the arm 172.

When the machine is at rest, the key lock shaft 171 and the arm 172 are positioned as shown in Fig. 6 and retain the sole of a foot-shaped upward extension 183 of the arm 180 to the right of and out of the path of a stud 184 carried by the arm 160 (Figs. 5 and 6). Clockwise movement of the shaft 171 and the arm 172, upon release of the machine for operation, permits the spring 182 to rock the arm 180 counter-clockwise to move the sole of the foot 183 beneath the stud 184 to obstruct movement of the arm 160 and the latch 159, causing said latch 159, in cooperation with the stud 158, to obstruct depression of the slip key 79 during machine operation, and to obstruct release of said key after it has been depressed during machine operation. Restoring movement counter-clockwise of the shaft 171 and the arm 172, near the end of machine operation, returns the arm 180 clockwise against the action of the spring 182, to move the sole of the foot 183 out of the path of the stud 184, prior to the functioning of the automatic release mechanism, which rocks the latch 159 out of engagement with the stud 158, to free the depressed slip key to the action of the spring 157 (Fig. 5), which restores said key upwardly to undepressed position.

*Slip key releasing mechanism*

Return movement clockwise of the arm 180 (Fig. 6), as explained above, causes a rearward surface on said arm, in cooperation with a stud 185 in a lever 186 free on a stud 187 secured in the right frame 50, to rock said lever counter-clockwise. The lever 186 carries, in a rearward extension thereof (Figs. 6 and 7), a stud 188, which underlies and coacts with a similar rearward extension of a lever 189, having a slot 190, which pivotally engages the stud 187. The lever 189 also has, in a forward extension thereof, a slot which freely engages the stud 184 in the arm 160. Counter-clockwise movement of the lever 186, upon restoring movement clockwise of the arm 180, rocks the lever 189 counter-clockwise, which movement is imparted by said lever, through the stud 184, to the arm 160 and the latch 159, to rock said parts also counter-clockwise, against the action of the spring 162, to move the latching shoulder on said latch out of the path of the stud 158, to free the slip key 79 for restoring movement upwardly, under influence of the spring 157, near the end of machine operation.

Mechanism under control of the Clerks' control keys 68 (Figs. 1 and 2) is provided for rendering the automatic releasing mechanism for the slip key 79 inoperative during the item-entering operations of multiple-item transactions, and during item-sub-total operations, the latter under control of the Sub-Total key 80.

The differential mechanism for the Clerks' keys 68 (Figs. 1 and 2) is operatively connected to the central forward one of the square transmission shafts 97 (Fig. 6), said shaft in turn supporting a pinion 193, which meshes with the internal teeth of a gear sector 194. The ends of the internal teeth on the sector 194 cooperate with the periphery of a corresponding disk 195, supported by the shaft 99, to rotatably support said sector 194. The sector 194 has a cam slot 196 engaged by a roller 197 in a rearward extension of a lever 198 free on a stud 199 extending between the plates 49 and 58 (Fig. 8). A forward extension of the lever 198 carries a stud 200, which engages a slot in an arm 201 free on a stud 202 secured in the frame 58. A slot in the arm 201 engages a stud 203 (Figs. 6 and 7) in the rear end of a slide 204 shiftably supported by means of two parallel slots therein, in cooperation with corresponding studs 205 secured in the plate 58. An upward extension of the slide 204 carries a stud 206, which engages a slot in the lever 189, for the purpose of shifting the rear end of said lever in relation to the stud 188.

As is generally known, a multiple-item transaction consists of several item-entering operations and a final item-total operation. In item-entering operations, the Department control keys 69 (Figs. 1 and 2) are used to initiate machine operation and to select corresponding department totalizers for receiving the amounts of the items. In the item-entering operations, therefore, none of the Clerks' control keys 68 are used, and consequently the differential mechanism for said keys remains in zero position, as indicated by the zero opposite the dot-and-dash line extending through the slot 196 in Fig. 6. This positions the downward, or smaller, circumferential portion of the slot 196 opposite the roller 197, and consequently said roller and the lever 198 are rocked counter-clockwise, which in turn rocks the arm 201 clockwise to shift the slide 204 forwardly. The slide 204 then, through the stud 206, carries the lever 189 forwardly in unison therewith, to move the rearward extension of said lever out of the path of the stud 188 (Figs. 6 and 7), and, as a result, operation of the lever 186 by the arm 180, near the end of machine operation, as explained above, imparts no movement to the lever 189. As a result, the latch 159 is not disengaged from the stud 158, and the slip key 79 remains depressed.

As is usual, the items are simultaneously accumulated in an item totalizer as they are entered in the department totalizers. Sometimes it is desirable to take a sub-total or a reading of the accumulated amount of the items, and to do this, the Item Sub-Total key 80 is used. Depression of the Item Sub-Total key 80 causes the sector 194 (Fig. 6) to be positioned so that the smaller circumferential portion of the cam slot 196 is opposite the roller 197, the same as explained in connection with the zero position of said sector 194, and, as before, the rear end of the lever 189 is moved beyond the stud 188, so that no releasing movement is imparted to the latch 159 at the end of item sub-total operations. As a result, the slip key 79 remains depressed.

The final item total operation of a multiple-item transaction is initiated by depression of one of the Clerks' keys 68, which also selects a corresponding clerk's totalizer to receive the item total cleared from the item totalizer. Depression of any one of the Clerks' keys 68, through the clerks' differential mechanism, positions the sector 194 (Fig. 6) so that the larger circumferential portion of the slot 196 is opposite the roller 197, causing said slot, in cooperation with the roller 197, to rock the lever 198 clockwise, to shift the slide 204 and the lever 189 rearwardly to move the rearward extension of said lever into the path of the stud 188. Operation of the arm 180 and the lever 186 near the end of machine operation rocks the lever 189, the arm 160, and the latch 159 counter-clockwise to disengage the said latch from the stud 158, to free the slip key 79 for upward restoring movement under influence of the spring 157.

Forward movement of the slide 204 (Figs. 6 and 7), as explained in connection with item-entering and item sub-total operations, moves an upward extension 208 thereof beneath the stud 184 to block counter-clockwise movement of the arm 160 and the latch 159 to insure that the slip key 79 is locked against releasing movement, after the arm 180 has been moved out of the path of said stud 184.

*Additional slip key interlocks*

Mechanism shown in Fig. 5 is provided for preventing releasing movement clockwise of the key lock shaft 171 when the slip key 79 is in a partially-depressed condition. A downward extension of the slip key 79 carries a stud 209, to which is pivotally connected the upper end of a link 210, the lower end of which is pivotally connected to a leg 211 free on a stud 212 secured in the frame 50. As the slip key 79 is being depressed, the link 210 rocks the leg 211 counter-clockwise, causing the sole of a foot 213 of said leg to move into the path of a roller 214, carried by the arm 172, to obstruct clockwise releasing movement of said arm and the key lock shaft 171 until the slip key 79 is fully depressed and the foot 213 is moved beneath and out of the path of said roller 214, as shown in dot-and-dash lines. Thereafter, releasing movement clockwise of the shaft 171 and the arm 172 causes the roller 214 to move over the foot 213 to secure the slip key 79 in depressed position until said key lock shaft is restored counter-clockwise near the end of machine operation.

In slip-printing operations, it is desirable that the receipt-printing mechanism be disabled or rendered inoperative, and the means for accomplishing this result will now be explained. The stud 209 (Fig. 5) in the slip key 79 pivotally supports the upper end of a link 215 pivotally connected at its downward end to an arm 216 free on a stud 217 secured in the right frame 50. Depression of the slip key 79 rocks the arm 216 counter-clockwise, as indicated in dot-and-dash lines, to move a blocking surface 218, on a rearward extension thereof, into the path of a stud 219 in a receipt control lever 220, to obstruct counter-clockwise movement of said lever, and thus disable the receipt-printing mechanism, whenever the slip key 79 is depressed.

The receipt control lever 220 (Fig. 5) is similar to and functions like the corresponding receipt control lever 791, disclosed in Fig. 40 and the description in connection therewith in the co-pending application Serial No. 341,633.

Depression of the slip key 79 (Fig. 5) causes a rearward extension 221 thereof, in cooperation with a stud 222 in an arm 223 on a receipt on-and-off shaft 224 journaled in the printer framework, to rock said arm 223 clockwise. A stud 236 connects the arm 223 to a no-receipt symbol type carrier 235, free on the shaft 224, for concert clockwise movement, which moves said type carrier 235 clockwise into printing position to print a symbol consisting of four vertically-alined dashes on the extreme left edge of the detail strip (Fig. 4) to signify that no receipt was issued in this particular operation.

Fast on the on-and-off shaft 224 is an arm 237, having pivotally connected thereto the upper end of a link 238, the lower end of which is pivotally connected to a blocking arm 239, free on the stud 217 and arranged to coact with a bent-over ear formed on the upper end of the receipt control lever 220. A torsion spring 240, wound around the on-and-off shaft 224 and connected between the stud 236 and a stud in the arm 237, urges said parts toward each other to normally maintain said stud 236 and a downward extension of said arm 237 in yielding contact with each other, to form a flexible connection between said arm 237, the arm 223, and the symbol type carrier 235. The flexible connection, effected by the spring 240, permits the arm 223 and the symbol type carrier 235 to move independently of the arm 237, upon depression of the slip key 79, and consequently said arm 237, the link 238, and the blocking arm 239 may remain in ineffective position, as shown here, while the no-receipt symbol type carrier 235 is moved to printing position independently thereof.

Secured on the right-hand end of the on-and-off shaft 224 (Fig. 5) is a knob (not shown) for operating said shaft, and a spring-actuated mechanism is provided for yieldingly retaining said shaft and the parts secured thereon in either "On" or "Off" position. In Fig. 5, the shaft 224 and connected parts are shown in "On" position. Rotation of the shaft 224 clockwise by means of the on-and-off knob carries the arm 237, the link 238, and the blocking arm 239 clockwise in unison therewith to move said blocking arm 239 into the path of the bent-over ear on the upper end of the lever 220, to obstruct counter-clockwise movement of said lever and thus render the receipt printing and issuing mechanisms inoperative.

*Mode of operation*

It is believed that a full understanding of the operation of the machine will have been obtained from a perusal of the preceding description; however, a brief description of the operations involved in preparing a slip, such as that shown in Fig. 3, will be given.

The machine chosen to illustrate the present invention is at present arranged to perform only multiple-item transactions and therefore is not arranged for single-item transactions. However, this is but a matter of rearranging the two rows of control keys 68 and 69, as illustrated in Figs. 1 and 2 of the co-pending application Serial No. 412,464, referred to before. Therefore, in the present machine, the amount keys 66 (Figs. 1 and 2) may not be used in conjunction with the Clerk's key 68 and must, therefore, be used in conjunction with the item or Department keys 69. This makes it necessary, in order to complete a transaction, to use both the Department control keys 69 and the Clerks' control keys 68 in connection with said transaction, and provides means for properly allocating and accumulating the amounts of the different items in the proper item or department totalizers and in the proper clerks' totalizers. Multiple-item transactions are performed with the total control lever 70 (Figs. 1 and 2) in "Register" position, as shown here.

There are two ways to handle a slip-printing operation, and it is a matter of choice which of these ways is employed. One way is to place the slip 77 (Fig. 3) upon the table 78 prior to the beginning of the slip-printing transaction, and move it into engagement with the stop finger 107 to properly locate said slip in relation to the printing mechanism, as shown in Fig. 1. The other way is to place and locate the slip 77 upon the table 78 just prior to the final, or item total, operation, which is performed under control of the Clerks' keys 68. This is entirely satisfactory, as the printing upon the slip takes place only in the item total operation, and obviously it is not necessary that the slip be on the table before such operation.

Prior to a slip-printing operation, it is necessary to depress the slip key 79. As explained in connection with Fig. 6, in all item-entering operations the mechanism which automatically releases the slip key is rendered inoperative, and said key is latched in depressed position until near the end of the final, or item total, operation, which, as previously explained, is performed under control of the Clerks' keys 68, which also control the positioning of the transmission gear sector 194 (Fig. 6), which in turn controls the automatic release of the Slip key. Depression of the Slip key 79 automatically disables the receipt printing and issuing mechanism, and consequently in all slip operations no receipt may be issued. However, every item which is set up on the amount keys 66, in item-entering operations, is simultaneously printed upon the detail strip 75 (Fig. 4), as are also item sub-totals and item totals.

With the slip 77 properly placed on the table 78, as shown in Fig. 1, the amount of the first item ($2.50) is set up on the amount keys 66 (Figs. 1 and 2), and the "I" Department key 69 is depressed to initiate machine operation, during which the amount of the item ($2.50) is printed upon the detail strip 75 (Fig. 4), the Roman number "I" is printed to the right of the amount to identify the department totalizer which received the amount, the consecutive number is printed to the left of the amount of the item, the letter "S" is printed to the left of the consecutive number to identify this as a slip-printing transaction, and the no-receipt symbol (four dashes in vertical alinement) is printed immediately to the left of the letter "S," to further identify this as a no-receipt transaction. The amount of the item is accumulated in the corresponding department totalizer and in the item totalizer.

(Next, the amount of the second item ($3.25) is set up on the amount keys 66, and the "II" Department key 69 is depressed to initiate an item-entering operation, in which the amount of the item and the other data, as explained in connection with the first item, are simultaneously printed upon the detail strip 75 and entered in the corresponding department totalizer and the item totalizer. The next two items are entered in exactly the same manner as explained above, and, as these items are all taxable items, the operator initiates an item sub-total operation by depressing the Sub-Total key 80 (Figs. 1 and 2). During this operation, the item totalizer is sub-totalized, and the amount ($17.25) accumulated therein is printed upon the detail strip 75. At the same time, the symbol "Sub" is printed immediately to the right of the item sub-total to identify this operation. Also, in the item sub-total operation, the other data, including the consecutive number, the letter "S," and the no-receipt symbol, are printed upon the detail strip, exactly as in the other operations.

Next, the amount of the tax (51 cents) is set up on the amount keys 66, and the Tax key 69, which is identified by the Roman numeral "V," is depressed to initiate a tax-entering operation, during which the amount of the tax is entered in the item totalizer and in the tax totalizer and is simultaneously recorded upon the detail strip 75, along with the other data, as explained in connection with the first item of the multiple-item transaction.

After all of the items and the tax have been properly entered, the "A" Clerk's key 68 is depressed to initiate an item total operation, during which the item totalizer is cleared, and the amount ($17.76) cleared therefrom is simultaneously entered into the "A" Clerk's totalizer and recorded upon the detail strip 75 (Fig. 4), as shown in the top line thereof, along with the letter "A," the consecutive number, the letter "S," and the no-receipt symbol. Also, during the item total operation, the amount of the item total ($17.76), the letter "A" for identifying the Clerk's key 68, the consecutive number, the date, and the machine number, 775, are printed upon the top, or shorter, portion of the slip 77, as shown in Fig. 3, whereupon said slip is fed a slight distance forwardly to aline the longer, or bottom, portion of said slip with the printing mechanism, after which said mechanism functions a second time to print the identical data upon both portions of said slip, thus providing an original and a duplicate copy thereof. The slip printing and feeding mechanisms and the control means therefor are shown principally in Figs. 11, 12, and 14 of the parent application Serial No. 519,426, referred to before. Near the end of the item total operation, the mechanism shown in Fig. 6 functions to automatically release the Slip key 79 for restoring movement upwardly to undepressed position. It will be recalled, by referring to Figs. 1, 2, and 5, that the Slip key 79 may be retained in depressed position for any required length of time by means of the slide 163, or said slide may be used to release the depressed Slip key manually at any time prior to the beginning of a multiple-item, slip-printing transaction, as it will be recalled that said key is secured against release until such transaction is completed.

In case the clip 77 was not placed upon the slip table 78 until just prior to the item total operation, the letter "S" will be printed only opposite the recording of the item total appearing near the top of the detail strip 75, and not with the other entries on said slip. The slip shown in Fig. 3 was prepared in this latter manner, and it will be noted that the slip symbol "S" was printed on the detail strip (Fig. 4) only in conjunction with the entry of the item total thereon.

As previously explained, reading and resetting the department totalizers are controlled by moving the total control lever 70 (Figs. 1 and 2) to "Read Row 2" or "Reset Row 2" position, and then using the department control keys 69 to select the different department totalizers for either reading or resetting operations. Likewise, it will be remembered that reading and resetting the Clerks' totalizers are accomplished by moving the total control lever 70 to "Read Row 1" or "Reset Row 1" position and using the Clerks' keys 68 to select the various clerks' totalizers for either reading or resetting operations. If desired, the totals either read or reset in the various department and clerks' totalizers may be recorded upon insertable record material at the same time they are being recorded upon the detail strip, and this is accomplished by depressing the Slip key 79 prior to such operations. In this case, it may be desirable to rotate the stop finger 107 until it is beneath the surface of the table 78, and use the lines 393 (Fig. 1) to locate the insertable record material in relation to the printing line. As the department totalizers are read or reset, the amounts contained in said totalizers are simultaneously printed upon the insertable record material; a Roman numeral corresponding to the key 69 depressed is printed to the right of the amount; an identifying symbol (X for read; Z for reset) is printed immediately to the left of the amount to identify the operation; and the consecutive number, the date, and the machine number are printed upon the record material in the same manner as explained before.

At the end of each department totalizer reading or resetting operation, the Slip key 79 is automatically released and is restored upwardly to undepressed position. In case it is desired to have the key remain depressed, so that all of the group or department totals may be read or reset without the necessity for depressing the Slip key 79 for each operation, the slide 163 (Figs. 1 and 5) may be used to latch the Slip key in depressed position.

The Clerks' totalizers corresponding to the Clerks' keys 68 may be read or reset in exactly the same manner as explained in connection with the department totalizers, under control of said keys 68, the only difference being that the letter "A," "B," "D," or "E," corresponding to the depressed Clerk's key, is printed immediately to the right of the total, to identify the Clerks' totalizers being read or reset. Near the end of each reading or resetting operation, the insertable record material is advanced automatically by the slip-feeding mechanism to obtain the proper spacing between the recordings of the data taken from the totalizers.

One way of readily distinguishing between reading and resetting operations in the department totalizers and the Clerks' totalizers is in the length of spacing between each recording. In the case of reading and resetting operations in connection with the department totalizers, the record material is single-line-spaced, and in connection with the Clerks' totalizers, the record material is double-line-spaced.

While the forms of mechanism herein shown and described are admirably adapted to fulfill the objects primarily stated, it is to be understood that it is not intended to confine the invention to the one form or embodiment disclosed herein, for it is susceptible of embodiment in various forms all coming within the scope and spirit of the invention.

What is claimed is:

1. In a machine of the character described, constructed and arranged to perform slip-printing operations, the combination of control elements to initiate and control slip-printing operations; a slip key operable to condition the machine for slip-printing operations; normally effective means to latch the slip key in operated condition; an operable member connected to the latching means; means to operate the member to unlatch the latching means; and means functioning under control of the control elements to move the member out of coacting relationship with its operating means and to simultaneously secure the latching means against operation by the member to retain the slip key in operated condition.

2. In a machine of the class described, constructed and arranged to perform slip-printing operations, the combination of a plurality of operable control elements to initiate and control slip-printing operations; a sector differentially positioned under control of the elements; a depressible slip key to condition the machine for slip-printing operations; means to latch the slip key in depressed position; an operable member connected to the latching means; means normally effective each machine operation to operate the member to unlatch the latching means to release the slip key; and means operated by the sector and effective in operations in which the control elements are not operated to move the member out of coacting relationship with the operating means to prevent release of the slip key, said means effective in operations in which the control elements are operated to retain the member in coacting relationship with the operating means to cause the slip key to be released.

3. In a machine of the character described, constructed and arranged to perform slip-printing operations, the combination of a plurality of control elements to initiate and control slip-printing operations; a sector adjustable to various positions under control of the control elements when they are used to initiate machine operation, and adjustable to a particular position when said control elements are not used to initiate machine operation; a depressible slip key to condition the machine for a slip-printing operation; means normally effective to retain the slip key in depressed condition; an operable member connected to the retaining means; normally effective means to operate the member to render the retaining means ineffective; and means including an element connected to the member, and coacting with the sector, and effective when said sector is adjusted to said particular position to move the member out of coacting relationship with its operating means to prevent release of the slip key, said element effective when the sector is positioned to any of said various positions under control of the control elements, to retain said member in coacting relationship with the operating means to cause the slip key to be released.

4. In a machine of the character described, constructed and arranged to perform slip-printing operations and non-slip-printing operations, the combination of a depressible slip key to condition the machine for a slip-printing operation; means to latch the slip key in depressed position; an operable member connected to the latching means; means normally effective to operate the member to unlatch the latching means, said member normally in operating relationship with its operating means, but movable out of operating relationship with said operating means; and means effective in slip-printing operations to retain the member in operating relationship with its operating means to cause the slip key to be released at the end of such operations, said means effective in non-slip-printing operations to move the member out of the path of its operating means to cause the slip key to remain depressed at the end of such operations.

5. In a machine of the class described, constructed and arranged to perform various types of operations including slip-printing operations, the combination of depressible control keys to initiate and control slip-printing operations; a depressible slip key to condition the machine for a slip-printing operation; means to latch the slip key in depressed position; operating means effective each machine operation to unlatch the latching means to release the slip key; a movable member connected to the latching means and movable into and out of coacting relationship with the operating means; and means controlled by the depressed control key to move the member into coacting relationship with the operating means to cause the slip key to be released, said means effective in other than slip-printing operations when no control key is depressed, to move the member out of coacting relationship with the operating means and to secure said operating means against operation to cause the slip key to be retained in depressed position.

6. In a machine of the class described, constructed and arranged to perform various types of operations, including slip-printing operations, the combination of control elements to initiate and control slip-printing operations; a depressible slip key to condition the machine for slip-printing operations; means to latch the slip key in depressed position; operating means effective each machine operation to unlatch the latching means to release the slip key; a movable member connected to the latching means and movable into and out of coacting relationship with the operating means; means including a sector positionable under control of the control elements and positionable in a neutral position in non-slip-printing operations; and means including a slide to operatively connect the sector to the member, whereby positioning of said sector by the control elements moves the member into coacting relationship with the operating means to cause the slip key to be released, whereby positioning of said sector in neutral position moves the member out of coacting relationship with the operating means to cause the slip key to be retained depressed.

7. In a machine of the class described, constructed and arranged to perform various operations, including slip-printing operations, the combination of a depressible slip key to condition the machine for slip-printing operations; means to latch the slip key in depressed position; a movable member connected to the latching means; normally effective means to impart one movement to the member to release the latching means; and means effective in other than slip-printing operations to impart a different movement to the member to move said member out of coacting relationship with the first moving means to prevent release of the latching means, said latter moving means also effective to secure the latching means against releasing movement.

No references cited.

UNITED STATES PATENT OFFICE

CERTIFICATE OF CORRECTION

Patent No. 2,915,969                                                            December 8, 1959

Frank R. Werner et al.

It is hereby certified that error appears in the printed specification of the above numbered patent requiring correction and that the said Letters Patent should read as corrected below.

Column 1, line 37, for "rata" read -- data --; column 8, line 17, after "223" insert -- free --.

Signed and sealed this 17th day of May 1960.

(SEAL)

Attest:

KARL H. AXLINE
Attesting Officer

ROBERT C. WATSON
Commissioner of Patents